(12) United States Patent
Fontanazzi et al.

(10) Patent No.: US 10,994,873 B2
(45) Date of Patent: May 4, 2021

(54) PACKAGING ASSEMBLY FOR FORMING AND SEALING A PLURALITY OF PACKS CONTAINING A POURABLE FOOD PRODUCT

(71) Applicant: TETRA LAVAL HOLDINGS & FINANCE S.A., Pully (CH)

(72) Inventors: Paolo Fontanazzi, Modena (IT); Massimo Pradelli, Reggio Emilia (IT); Fabrizio Rimondi, Bologna (IT); Fabio Ricci Curbastro, Ozzano dell' Emilia Bologna (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/758,558

(22) PCT Filed: Oct. 24, 2018

(86) PCT No.: PCT/EP2018/079153
§ 371 (c)(1),
(2) Date: Apr. 23, 2020

(87) PCT Pub. No.: WO2019/086307
PCT Pub. Date: May 9, 2019

(65) Prior Publication Data
US 2020/0346795 A1 Nov. 5, 2020

(30) Foreign Application Priority Data

Oct. 31, 2017 (EP) .................................... 17199312

(51) Int. Cl.
*B65B 9/12* (2006.01)
*B29C 65/00* (2006.01)
(Continued)

(52) U.S. Cl.
CPC ............ *B65B 9/12* (2013.01); *B29C 65/3656* (2013.01); *B29C 65/7451* (2013.01);
(Continued)

(58) Field of Classification Search
CPC ......... B65B 21/06; B65B 21/08; B65B 5/106; B65B 5/068; B65B 7/20; B65B 7/02;
(Continued)

(56) References Cited

U.S. PATENT DOCUMENTS

| | | | | |
|---|---|---|---|---|
| 4,073,121 A | * | 2/1978 | Greenawalt | B29C 66/1122 53/511 |
| 4,215,520 A | * | 8/1980 | Heinzer | B65B 9/2042 53/173 |

(Continued)

FOREIGN PATENT DOCUMENTS

| | | |
|---|---|---|
| EP | 0887264 A1 | 12/1998 |
| EP | 3053835 A1 | 8/2016 |

(Continued)

OTHER PUBLICATIONS

International Search Report and Written Opinion issued in corresponding International Patent Application No. PCT/EP2018/079153, 10 pages (dated Nov. 21, 2018).

*Primary Examiner* — Thomas M Wittenschlaeger
(74) *Attorney, Agent, or Firm* — Buchanan Ingersoll & Rooney PC

(57) ABSTRACT

There is described a packaging assembly configured to form and seal a plurality of packs for containing a pourable food product starting from a tube of packaging material; the packaging assembly comprises a pair of tracks and at least a pair of moving elements, which are cyclically movable along the tracks, respectively; each moving element comprises one forming unit configured to cooperate with the tube so as to surround a portion of the tube destined to form (Continued)

a main portion of one respective pack; and one sealing unit configured to cooperate with the tube to sequentially seal the tube at predetermined consecutive cross sections, each pair of consecutive cross sections forming opposite sealing bands of one respective pack; each forming unit is mounted onto the respective moving element in a linearly movable manner towards and away from the sealing unit mounted onto the same moving element.

21 Claims, 12 Drawing Sheets

(51) Int. Cl.
| | |
|---|---|
| *B29C 65/36* | (2006.01) |
| *B29C 65/74* | (2006.01) |
| *B65B 51/30* | (2006.01) |
| *B65B 61/24* | (2006.01) |
| *B65B 9/20* | (2012.01) |
| *B65B 9/207* | (2012.01) |
| *B29L 31/00* | (2006.01) |

(52) U.S. Cl.
CPC ...... *B29C 66/4312* (2013.01); *B29C 66/8161* (2013.01); *B29C 66/82263* (2013.01); *B29C 66/849* (2013.01); *B65B 9/207* (2013.01); *B65B 9/2049* (2013.01); *B65B 51/303* (2013.01); *B65B 61/24* (2013.01); *B29L 2031/7166* (2013.01)

(58) Field of Classification Search
CPC ....... B65B 17/025; B65B 27/04; B65B 51/02; B65B 51/146; B65B 51/303; B65B 35/44; B65B 43/52; B65B 65/006; B65B 9/2049; B65B 9/12; B65B 9/207; B65B 61/24; B29C 65/3656; B29C 65/7451; B29C 66/4312; B29C 66/8161; B29C 66/82263; B29C 66/849; B29L 2031/7166
See application file for complete search history.

(56) References Cited

U.S. PATENT DOCUMENTS

| | | | | |
|---|---|---|---|---|
| 5,001,891 | A * | 3/1991 | Abate | B29C 65/18 156/583.5 |
| 6,038,838 | A * | 3/2000 | Fontanazzi | B65B 51/30 53/551 |
| 6,161,366 | A * | 12/2000 | Bausch | B65B 51/306 53/373.7 |
| 6,625,517 | B1 * | 9/2003 | Bogdanov | B29C 66/872 700/193 |
| 7,059,100 | B2 * | 6/2006 | Babini | B29C 65/7451 53/376.2 |
| 8,919,081 | B2 * | 12/2014 | Andreotti | B29C 66/8491 53/451 |
| 10,046,873 | B2 * | 8/2018 | Razzaboni | G07D 11/125 |
| 10,195,790 | B2 * | 2/2019 | Fontanazzi | B29C 65/7451 |
| 10,549,485 | B2 * | 2/2020 | Fontanazzi | B29C 65/18 |
| 10,661,924 | B2 * | 5/2020 | Andreotti | B65B 1/02 |

FOREIGN PATENT DOCUMENTS

| | | |
|---|---|---|
| WO | 0064741 A2 | 11/2000 |
| WO | 0064741 A3 | 2/2001 |

* cited by examiner

PACKAGING ASSEMBLY FOR FORMING AND SEALING A PLURALITY OF PACKS CONTAINING A POURABLE FOOD PRODUCT

TECHNICAL FIELD

The present invention relates to a packaging assembly configured to form and seal a plurality of packs containing a pourable food product.

BACKGROUND ART

As it is generally known, many pourable food products, such as fruit juice, UHT (ultra-high temperature-treated) milk, wine, tomato sauce, etc., are sold in packages made of sterilized packaging material.

A typical example is the parallelepiped-shaped package for pourable food products known as Tetra Brik Aseptic (registered trademark), which is made by folding and sealing a laminated web of packaging material. The packaging material has a multilayer structure comprising a base layer, e.g. made of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Such packages are normally produced on fully automatic packaging assemblies, on which a continuous tube is formed from a web of packaging material fed to such unit. The web of packaging material is sterilized on the packaging assembly, e.g. by applying a chemical sterilizing agent, such as hydrogen peroxide solution, which, once sterilization is completed, is removed from the surfaces of the packaging material, e.g. evaporated by heating. The web so sterilized is then maintained in a closed, sterile environment, and is folded and sealed longitudinally to form the tube, which is fed to the packaging assembly, along a vertical advancing direction.

In order to complete the forming operations, the tube is filled with the sterilized food product and is sealed and subsequently cut along equally spaced transversal cross sections.

Pillow packs are obtained thereby, which present a longitudinal sealing band and a pair of top and bottom transversal sealing bands.

WO00/64741 discloses a packaging assembly, which comprises two conveyors provided with:

a first track and a second track, which are arranged on respective opposite lateral sides of the tube; and a plurality of first carts configured to move on the first track, and a plurality of corresponding second carts configured to move on the second track.

In particular, the first track and second track define respective endless paths, comprising:

respective operative branches, substantially parallel and facing each other, and between which the tube of packaging material is fed, so that the first and the second carts cooperate with the tube; and respective return branches, along which the first carts and the second carts are spaced apart from the tube.

The first carts are movable independently from one another along the first path, and the second carts are movable independently from one another along the second path. For achieving the independent movement of the carts, linear motors are used: each track is equipped with electric coils, which, in a well-known manner, independently control the movement of each cart, the latter being equipped with corresponding permanent magnets.

Each first cart is provided with a forming unit and a sealing unit, and each corresponding second cart is provided with a forming unit and a counter-sealing unit.

Each forming unit comprises a half-shell, and each sealing unit comprises a cutting element or, in the case of the second carts, a counter-knife element.

In particular, the half-shell and the sealing unit of each first cart and the corresponding half-shell and counter-sealing unit of each second cart are cyclically movable between:

an open position, in which they are detached from the tube; and a closed position, in which they contact the tube to define and control the volume of the packs being formed, and to seal each pack at equally spaced, consecutive transversal cross sections.

In greater detail, when the carts are moving along the return branches, the half-shells and the sealing units are in open positions, and when the carts are moving along the operative branches the half-shells and the sealing units move from open positions to closed positions and vice-versa.

To this end, the half-shells are forced to stay in the open positions by respective springs, and carry respective cam followers configured to cooperate with respective cams to move the half-shells towards the closed positions. This occurs as each cart starts to advance along the respective operative branch.

Similarly, the sealing units are forced to stay in the open positions by respective springs, and carry respective cam followers configured to cooperate with respective cams to move the sealing units towards the closed positions. This occurs as each cart starts to advance along the respective operative branch.

The profiles of the cams are, thus, designed to control the smoothest transition between the open position and the closed position assumed by each half-shell and each sealing/counter-sealing unit during the forming and sealing operations, further preventing undesired stress on the materials.

Each half-shell carried by the respective cart has a C-shaped cross section and comprises, integrally: a main wall, and two parallel lateral flaps projecting towards the direction of the tube of packaging material from respective opposite end edges of the main wall.

In their closed positions, the two half-shells, cooperating with the same portion of the tube, are configured to completely surround such portion so as to control the volume of the tube and the volume of the pack being formed. More specifically, in the closed positions, the main walls of such half-shells are located on opposite sides of the tube and are parallel to each other.

However, the packaging assembly shown in WO00/64741 presents the following drawback. In particular, each cart carries one forming unit and one sealing unit together, and so the control of the volume of the package being formed is not optimized, due to such a rigid configuration of the structure. In other words, the movement of each single cart influences the movements of the forming unit and sealing unit carried by the cart itself.

This problem is solved by EP-A-3053835, which discloses a packaging assembly of the linear-motor type, wherein the forming units (thus, the half-shells) and the sealing/counter-sealing units moving on each track are carried separately by different and independent carts. Therefore, each forming unit can move independently with respect to the adjacent sealing/counter-sealing unit.

However, such configuration provides a large number of carts.

DISCLOSURE OF INVENTION

It is therefore an object of the present invention to provide a packaging assembly, which is designed to overcome the above-mentioned drawbacks in a straightforward and low-cost manner.

This object is achieved by a packaging assembly as claimed in claim 1.

BRIEF DESCRIPTION OF THE DRAWINGS

Three preferred, non-limiting embodiments of the present invention will be described by way of example with reference to the accompanying drawings, in which:

FIG. 5b is a larger-scale, perspective view of a detail of the cart of FIG. 5a;

FIG. 10b is a larger-scale, perspective view of a detail of the cart of FIG. 10a.

BEST MODE FOR CARRYING OUT THE INVENTION

Figure 1:
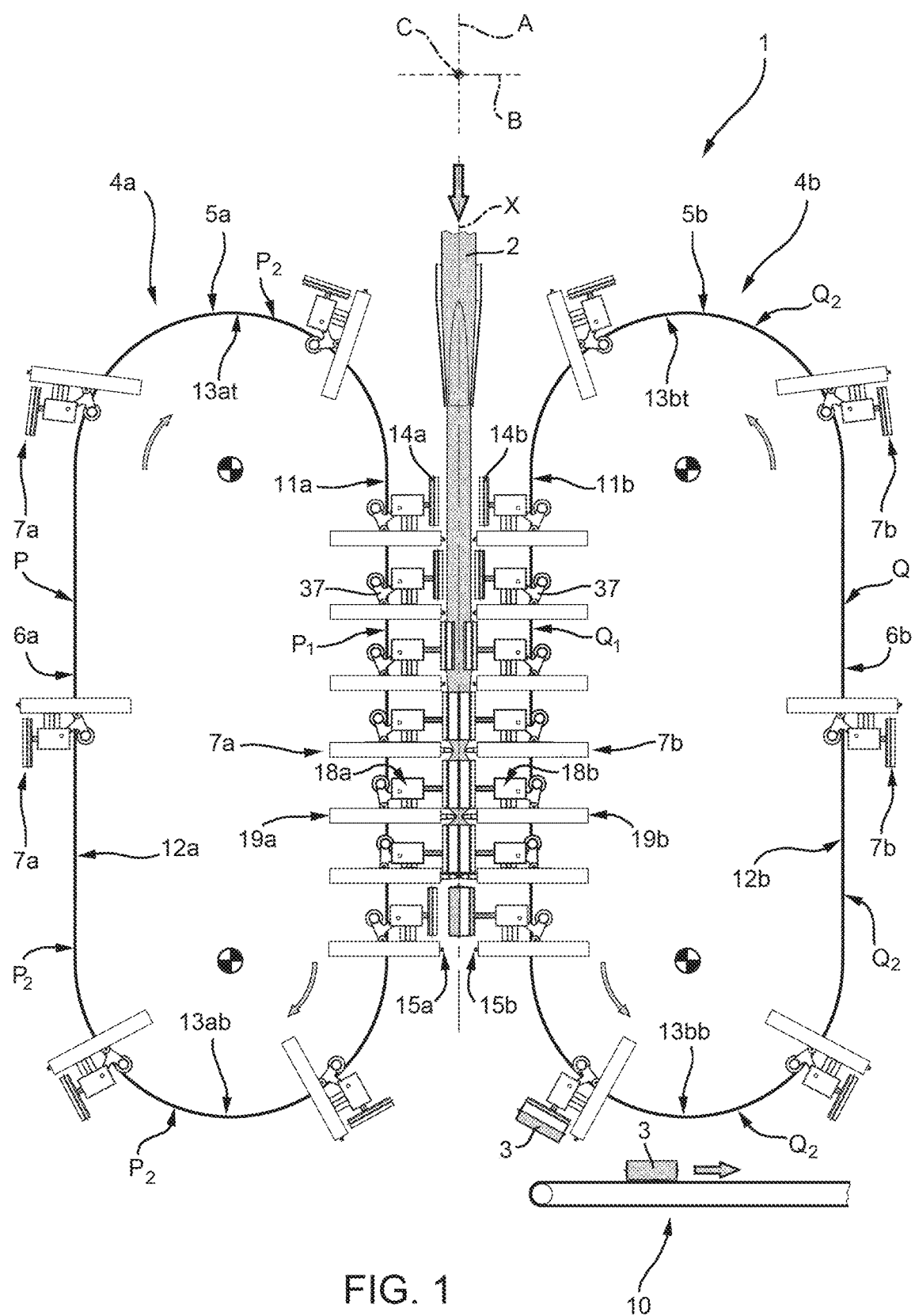
FIG. 1 is a schematic front view, with parts removed for clarity, of a packaging assembly for forming a plurality of sealed packs according to the teachings of the present invention.

With reference to FIG. 1, number 1 indicates as a whole a packaging assembly configured to form and seal a plurality of packs 3 containing a pourable food product starting from a tube 2 of packaging material.

In particular, packs 3 are suitable for containing pourable food products, such as pasteurized milk or fruit juice, and comprise a substantially prismatic main portion 3a delimited at the top and bottom by respective protruding sealing bands 3b.

The packaging material has a multilayer structure (not shown), and comprises a layer of fibrous material, e.g. paper, covered on both sides with respective layers of heat-seal plastic material, e.g. polyethylene.

In the case of aseptic packages for long-storage products, such as UHT milk, the packaging material also comprises a layer of gas-and-light barrier material, e.g. aluminum foil or ethylene vinyl alcohol (EVOH) film, which is superimposed on a layer of heat-seal plastic material, and is in turn covered with another layer of heat-seal plastic material, the latter forming the inner face of the package eventually contacting the food product.

Tube 2 is formed in known manner by longitudinally folding and sealing a web (not shown) of packaging material. Tube 2 is then filled by a pipe (not shown) with the food product and is fed to packaging assembly 1 along a vertical axis X identifying a vertical direction A.

It is also possible to identify two horizontal directions B, C orthogonal to one another and to direction A.

Packaging assembly 1 comprises:

a pair of conveyors 4a, 4b arranged on respective lateral sides of packaging assembly 1, with respect to axis X of tube 2, spaced with respect to one another along direction B, and configured to cooperate with the tube 2 itself; and an outlet conveyor 10, which is arranged below conveyors 4a, 4b and staggered from axis X along direction B.

In particular, conveyors 4a, 4b are configured to cooperate with tube 2 to form a plurality of pillow packs 3, and to seal tube 2 itself at equally spaced cross-sections, or sealing bands, crosswise to direction A.

Furthermore, conveyors 4a, 4b cooperate with tube 2 to cut such packs 3 through the sealing bands, so as to separate them from one another.

Outlet conveyor 10 is configured to receive and convey packs 3 towards a non-shown folding unit, in which packs 3 are folded into their final shapes.

Conveyor 4a substantially comprises:

a frame 5a, which defines one or more tracks 6a, two in the preferred embodiment shown, spaced along direction C with respect to one another; and a plurality of carts 7a consecutive and adjacent to one another, and configured to cyclically slide along tracks 6a.

Similarly, conveyor 4b substantially comprises:

a frame 5b, which defines one or more tracks 6b, two in the preferred embodiment shown, spaced along direction C with respect to one another; and a plurality of carts 7b consecutive and adjacent to one another, configured to cyclically slide along tracks 6b.

In particular, each frame 5a, 5b is delimited by (FIG. 3):

two planar oval surfaces 8 opposite to one another and lying on respective vertical planes parallel to direction A and B; and a curved endless surface 9, which extends between surfaces 8, connecting the latter along direction C.

With particular reference to FIG. 1, tracks 6a of frame 5a define an endless path P, whilst tracks 6b of frame 5b define an endless path Q; paths P and Q are arranged on opposite sides of axis X of tube 2.

Each path P, Q comprises:

a rectilinear portion 11a, 11b, which extends along direction A and faces tube 2;

a rectilinear portion 12a, 12b, which extends along direction A and is opposite to rectilinear portion 11a or 11b;

a top curved portion 13*at*, 13*bt* connecting the top ends of relative rectilinear portions 11*a*, 12*a* and, respectively, 11*b*, 12*b*; and a bottom curved portion 13*ab*, 13*bb* connecting the bottom ends of relative rectilinear portions 11*a*, 12*a* and, respectively, 11*b*, 12*b*.

Furthermore, paths P, Q comprise:

respective operative branches P1, Q1 substantially parallel and facing each other, between which tube 2 is fed, and along which carts 7*a*, 7*b* cooperate with tube 2 itself; and respective return branches P2, Q2, along which carts 7*a*, 7*b* are detached from tube 2.

In greater detail, each operative branch P1, Q1 comprises in turn the respective rectilinear portion 11*a*, 11*b*, and each return branch P2, Q2 comprises in turn the respective rectilinear portion 12*a*, 12*b*, the respective pair top curved portions 13*at*, 13*bt* and the respective bottom curved portions 13*ab*, 13*bb*.

Therefore, carts 7*a* slide, in use, along rectilinear portions 11*a* and 12*a* and curved portions 13*at*, 13*ab* of path P, and carts 7*b* slide, in use, along rectilinear portions 11*b* and 12*b* and curved portions 13*bt*, 13*bb* of path Q.

Furthermore, each cart 7*a* is associated to the corresponding cart 7*b*, defining in this way a pair of carts 7*a*, 7*b*.

Each pair of carts 7*a*, 7*b* is configured to cooperate with tube 2 in order to form and seal one respective pack 3 at a time, and cut the latter at the relative sealing band to separate the pack 3 from tube 2 (FIG. 1).

Figure 4:
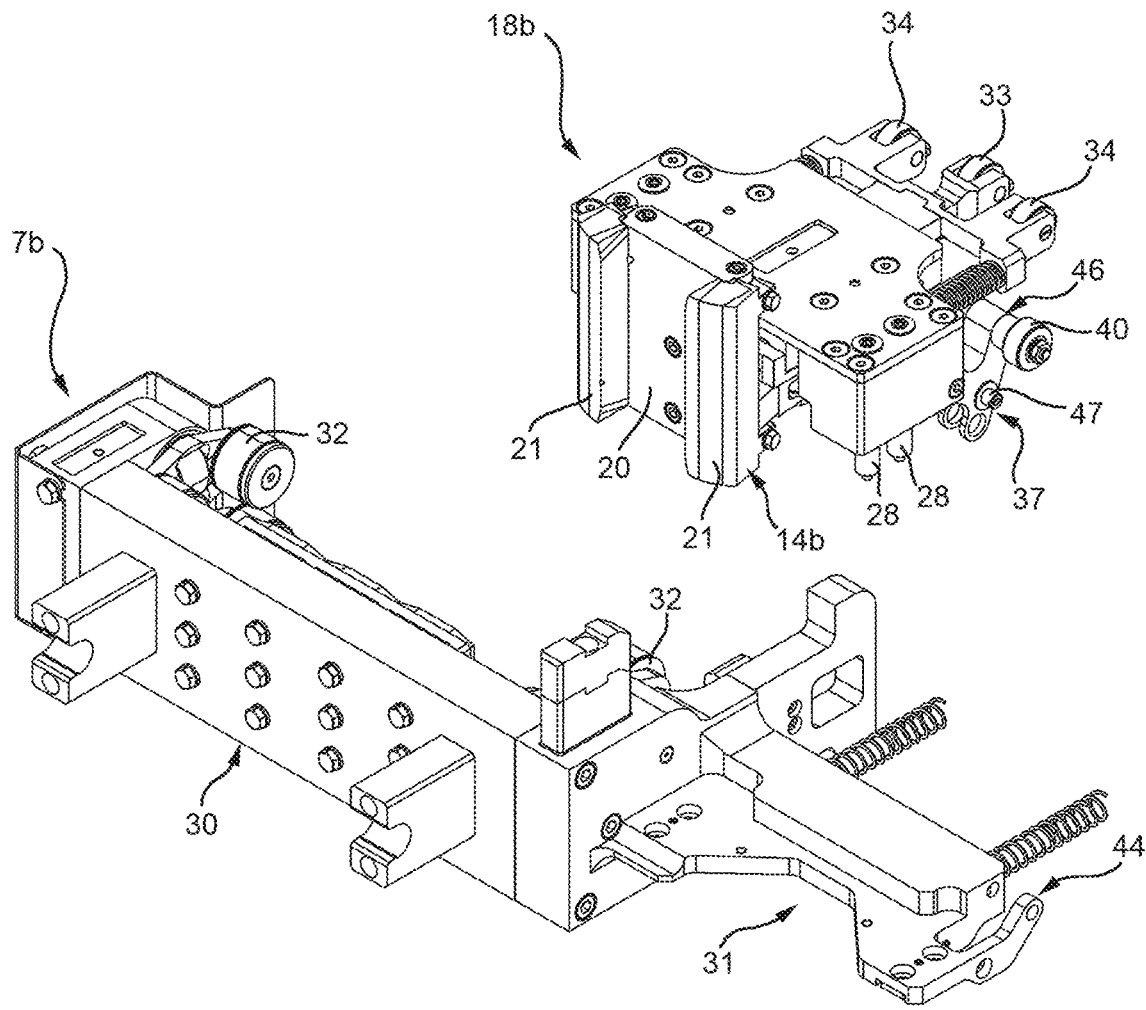
FIG. 4 is an exploded perspective view of a cart of the packaging assembly of FIG. 1.
Figure 4:
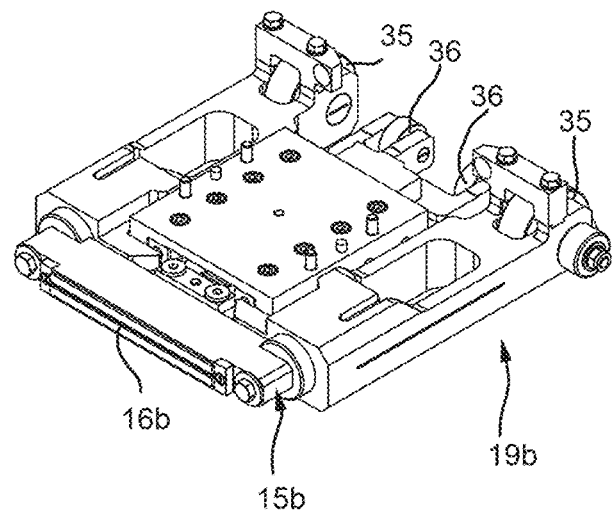
Figure 5B:
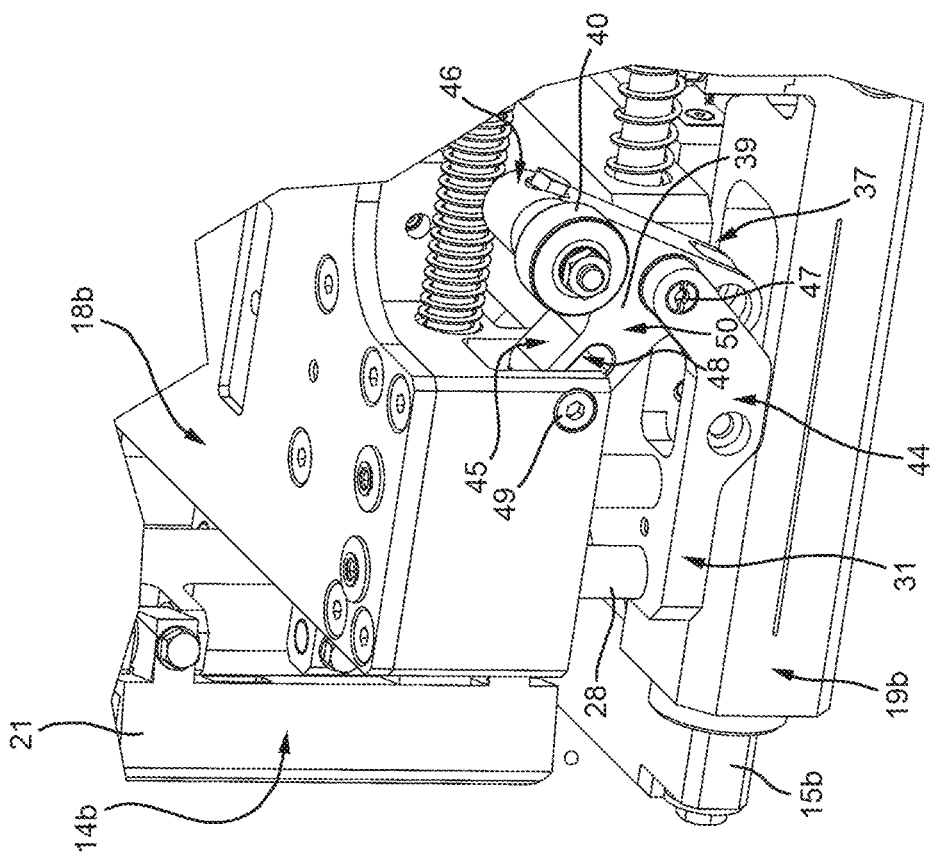
Figure 5A:
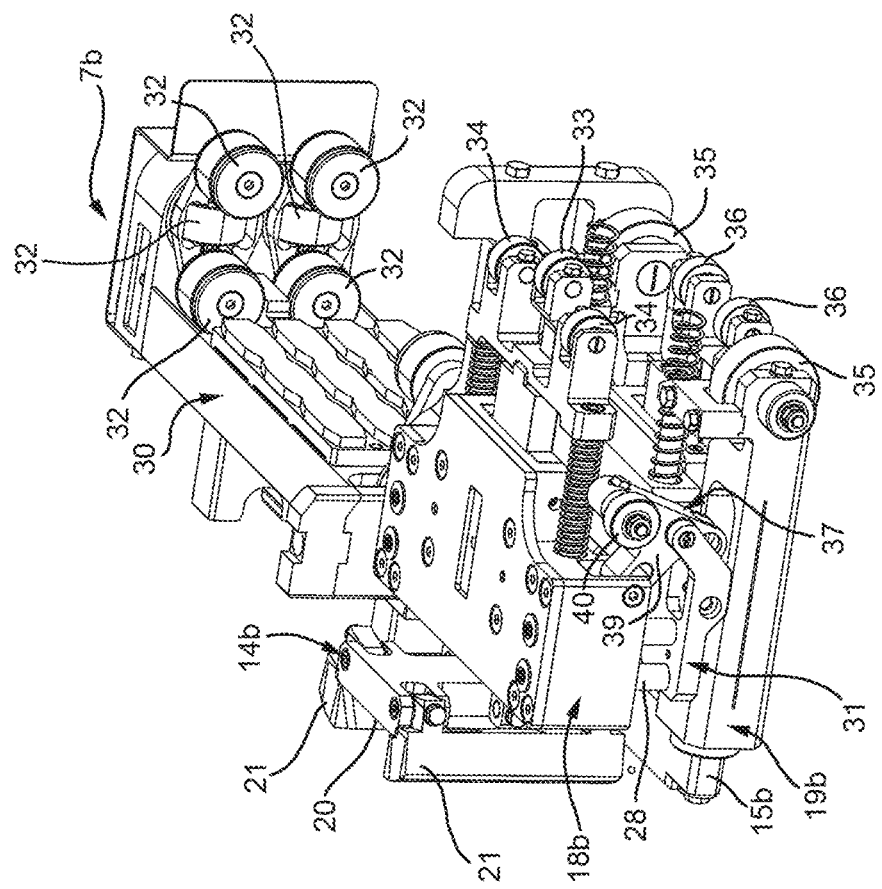
FIG. 5a is a perspective view of the cart of FIG. 4.

In particular, each cart 7*a*, 7*b* substantially comprises (FIGS. 4 and 5*a*) a body unit 30, which extends parallel to direction B, and an arm 31, which protrudes along direction B from one side of body unit 30, being connected, in particular integral, therewith.

In greater detail, body unit 30 is provided, at its opposite axial ends, with a plurality of wheels 32, six in this preferred embodiment, configured to roll onto the relative tracks 6*a*, 6*b*.

Carts 7*a* are movable along tracks 6*a* independently from one another and from carts 7*b*; the same applies to carts 7*b* with respect to tracks 6*b*.

For this purpose, each cart 7*a*, 7*b* is provided with a magnet (not shown), or a magnetic portion (not shown), configured to be magnetically coupled with magnetic field sources 17, e.g. electric coils, arranged in a fixed position below the respective curved surface 9, so as to independently control the movement of carts 7*a*, 7*b* along the respective tracks 6*a*, 6*b*.

In practice, carts 7*a*, 7*b* and frames 5*a*, 5*b* define a linear motor, which, in a known manner, independently controls the movement of the carts 7*a*, 7*b*.

Arm 31 of each cart 7*a*, 7*b* carries, at opposite sides with respect to direction A, a forming unit 18*a*, 18*b* and a sealing unit 19*a*, 19*b*, both configured to cooperate with tube 2 along operative branches P1, Q1.

In particular, each forming unit 18*a*, 18*b* is mounted onto the respective cart 7*a*, 7*b* in a slidable manner along one or more linear guides 28, carried by the respective arm 31, and comprises a respective volume control device, preferably a half-shell 14*a*, 14*b*, presenting a C-shaped cross section and comprising a main wall 20 and a pair of lateral flaps 21.

More specifically, linear guides 28 extend parallel to axis X and direction A when the respective cart 7*a*, 7*b* moves along the operative branch P1, Q1 of the relative path P, Q.

Preferably, flaps 21 project from the respective wall 20 from respective opposite lateral edges, of the wall 20 and are hinged to such edges.

Each sealing unit 19*b* is mounted underneath arm 31 of the respective cart 7*b* and comprises a sealing device 15*b* and an extractable cutting element 16*b*;

Each corresponding sealing unit 19*a* is fixed underneath arm 31 of the respective cart 7*a* and comprises a counter-sealing device 15*a* and a non-shown seat, which is adapted to receive corresponding cutting element 16*b*, when the latter is extracted.

In the preferred embodiment shown, sealing devices 15*b* are inductive heating elements and the corresponding counter-sealing devices 15*a* are made of elastomeric material, which provides the necessary mechanical support to grip tube 2 to the required pressure.

In light of the above, each cart 7*a*, 7*b* advances along the respective path P, Q, one single forming unit 18*a*, 18*b* and one single sealing unit 19*a*, 19*b*, carried on the respective arm 31.

Therefore, half-shells 14*a*, 14*b*, counter-sealing devices 15*a* and sealing devices 15*b* are, in use, cyclically driven by the respective carts 7*a*, 7*b* along the respective paths P, Q.

In particular, such components are cyclically driven respectively on: operative branches P1, Q1, along which half-shells 14*a*, 14*b*, counter-sealing devices 15*a* and sealing devices 15*b* downwardly move parallel to direction A and to axis X and are arranged on respective opposite sides of tube 2; and return branches P2, Q2, along which half-shells 14*a*, 14*b*, counter-sealing devices 15*a* and sealing devices 15*b* sequentially move away from axis X, upwardly parallel to direction A, on the opposite side of tube 2, and back towards axis X again.

In greater detail, half-shells 14*a*, 14*b*, counter-sealing devices 15*a* and sealing devices 15*b* are driven along operative branches P1, Q1 as respective carts 7*a*, 7*b* move along rectilinear portions 11*a*, 11*b* of the relative tracks 6*a*, 6*b*.

Furthermore, half-shells 14*a*, 14*b*, counter-sealing devices 15*a* and sealing devices 15*b* are driven along return branches P2, Q2 as respective carts 7*a*, 7*b* move along rectilinear portions 12*a*, 12*b* and curved portions 13*at*, 13*ab*, 13*bt*, 13*bb* of the relative tracks 6*a*, 6*b*.

Figure 2:
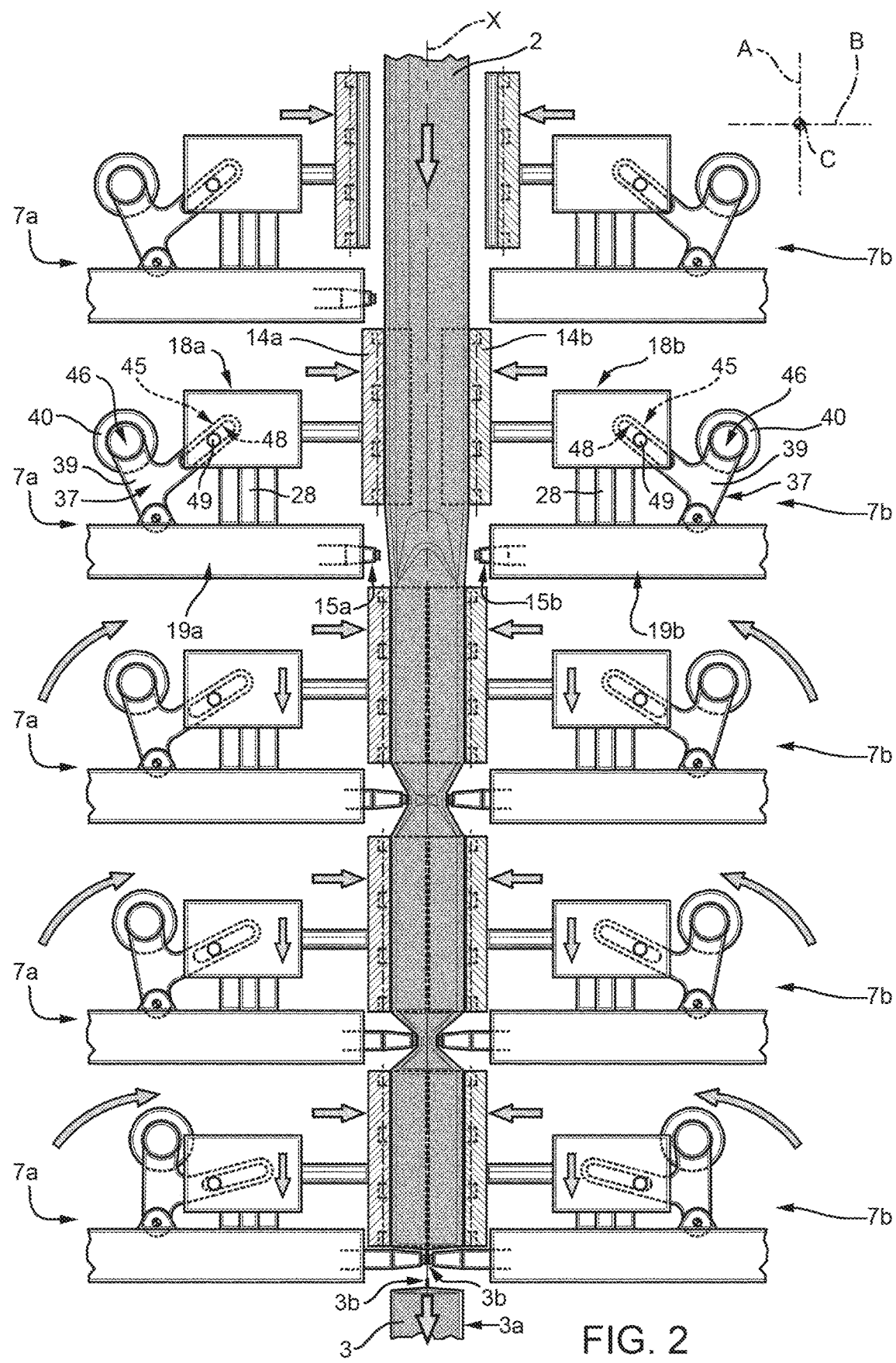
FIG. 2 is a larger-scale, front view of a detail of the packaging assembly of FIG. 1.

As shown in FIGS. 1 and 2, when forming units 18*a*, 18*b* and sealing units 19*a*, 19*b* are driven by the respective carts 7*a*, 7*b* along operative branches P1, Q1 of path P, Q, the respective half-shells 14*a*, 14*b* move back and forth along direction B between:

a closed position, or operative position, in which they cooperate with tube 2 to form main portions 3*a* of respective packs 3; and an open position, or idle position, in which they are detached from said tube 2 or said formed packs 3.

Furthermore, when forming units 18*a*, 18*b* and sealing units 19*a*, 19*b* are driven by the respective carts 7*a*, 7*b* along operative branches P1, Q1 of path P, Q, sealing devices 15*b* and counter-sealing devices 15*a* cyclically move back and forth with respect to direction B between:

a closed position, or operative position, in which they cooperate with diametrically opposite sides of tube 2 and form sealing bands 3*b* of respective packs 3; and an open position, or idle position, in which they are detached from said tube 2.

As a consequence, the movement of half-shells 14*a*, 14*b*, sealing devices 15*b* and counter-sealing devices 15*a* between the above-mentioned operative and idle positions is superimposed to the movement of the same along operative branches P1, Q1.

In particular, when two half-shells 14*a* and 14*b* of two respective forming units 18*a* and 18*b* are both in operative (closed) position, they define a substantially prismatic cavity and accordingly control the volume and shape of relative pack 3 in formation.

More specifically, when half-shells 14a, 14b are in operative (closed) position, their walls 20 are located on opposite sides of axis X, are parallel to direction A and to each other, and contact tube 2.

In such a condition, flaps 21 of each half-shell 14a, 14b rotate from an idle position in which they diverge from the relative wall 20, to an operative position in which they are substantially orthogonal to the wall 20, face flaps 21 of the other half-shell 14b, 14a, and contact tube 2 to completely surround a portion of the tube 2 destined to form the main portion 3a of one respective pack 3.

Conversely, when half-shells 14a, 14b are in idle (open) position, their walls 20 are detached from tube 2, and their flaps 21 rotate back up to their idle positions in which they diverge from the respective walls 20.

According to a possible alternative not shown, such half-shells 14a and 14b may also surround, in their operative positions, only partially the corresponding portion of tube 2.

When counter-sealing devices 15a and sealing devices 15b are in operative (closed) position, they cooperate with one another to heat-seal tube 2, so as to form the transversal sealing bands of packs 3.

Then, the relative cutting elements 16b are extracted, so as to cut and separate formed packs 3 from one another.

Conversely, when counter-sealing devices 15a and sealing devices 15b are in idle (open) position, they are detached from tube 2.

Preferably, the above-mentioned cyclic movement of half-shells 14a, 14b, counter-sealing devices 15a and sealing devices 15b from their idle positions to their operative positions and vice-versa, is automatized by means of a cooperation between a cam assembly 22a, 22b and a plurality of cam followers carried by forming units 18a, 18b and sealing units 19a, 19b.

In this preferred embodiment, each forming unit 18a, 18b carries one cam follower 33 linked to the respective half-shell 14a, 14b, and two cam followers 34 linked to the respective flaps 21.

Each sealing unit 19a, 19b carries two cam followers linked to the respective counter-sealing/sealing devices 15a, 15b.

Each sealing unit 19b carries two further cam followers 36 linked to the respective cutting element 16b.

Figure 3:
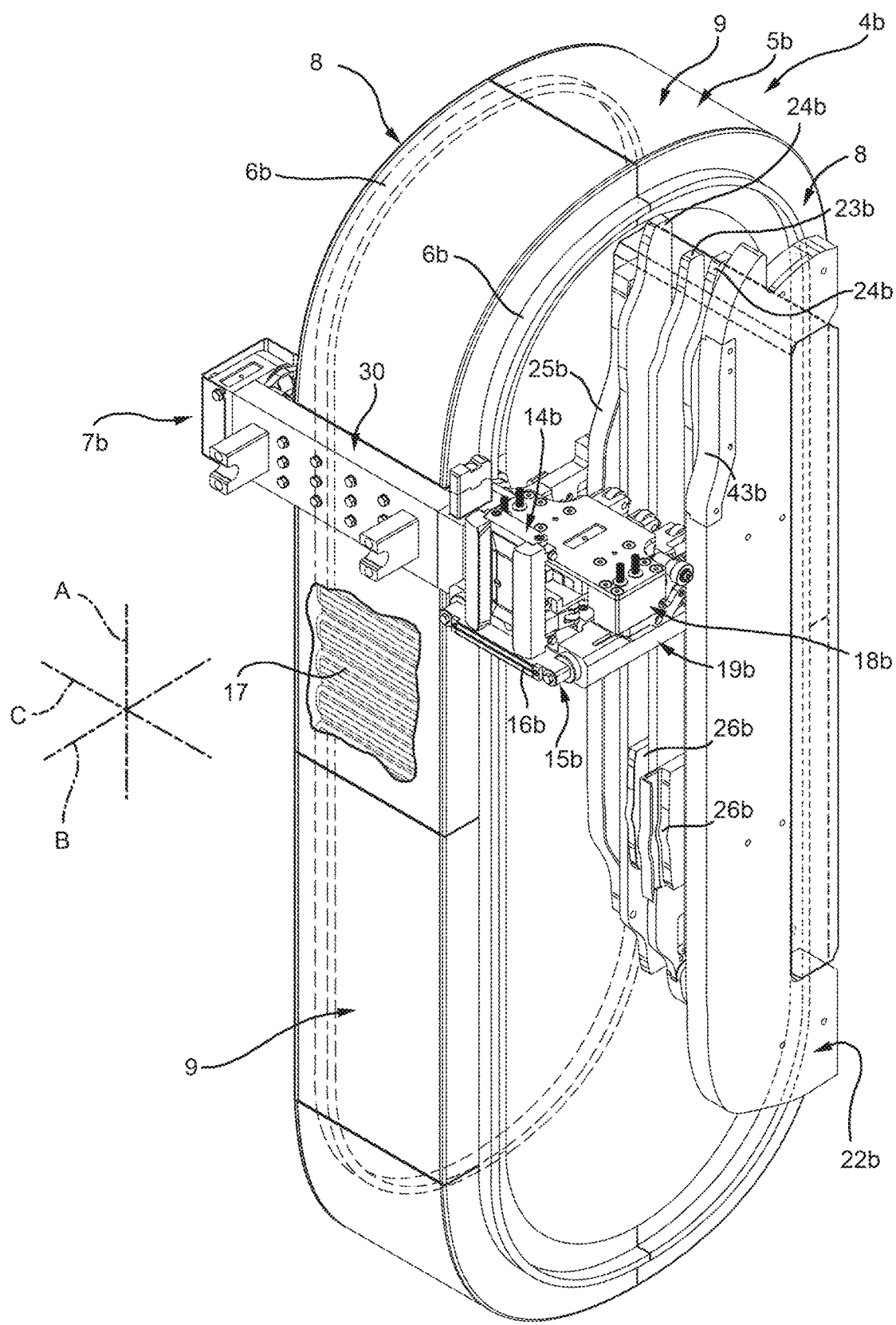
FIG. 3 is a perspective view, with parts removed for clarity, of a portion of the packaging assembly of FIG. 1.
Figure 6:
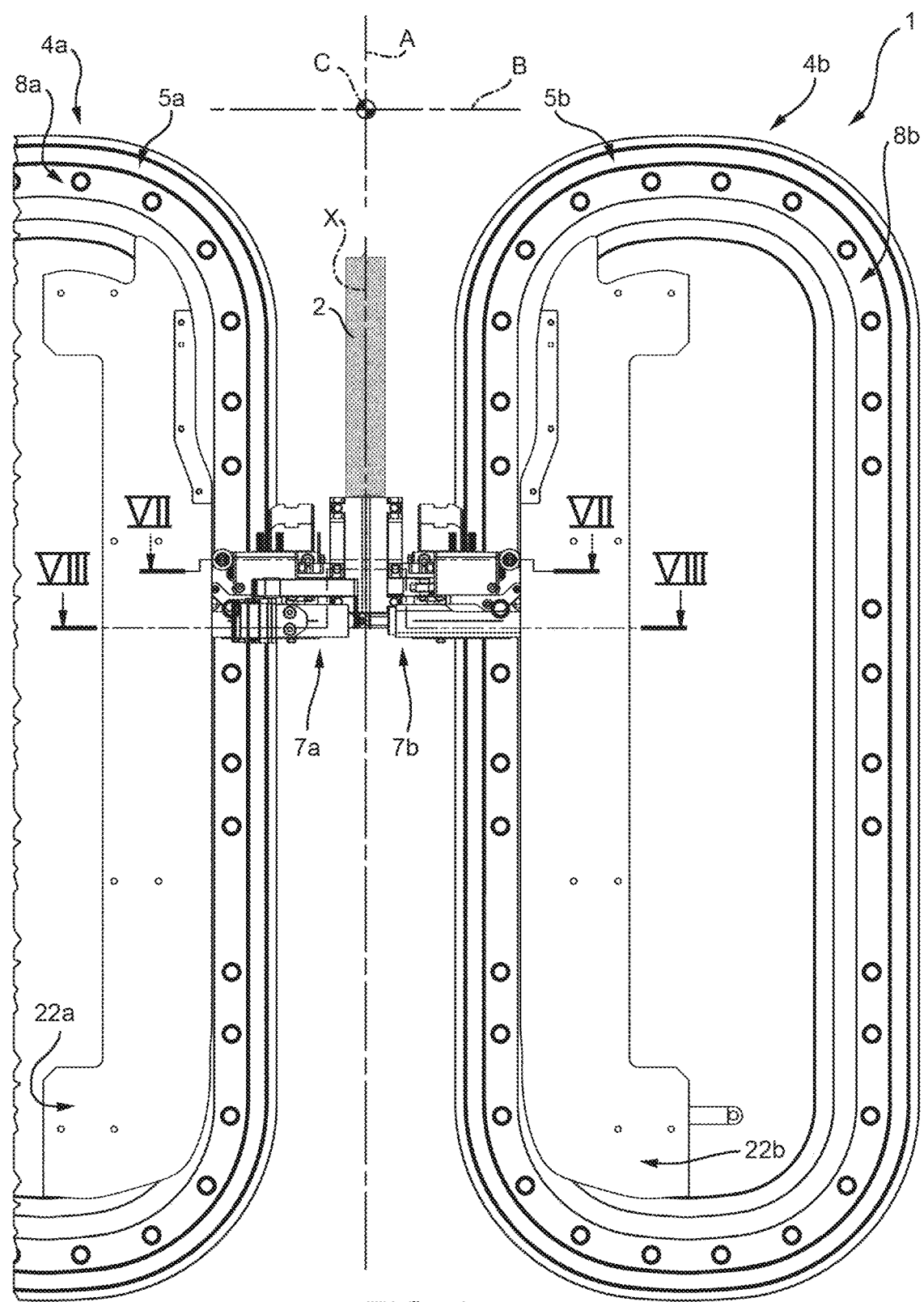
FIG. 6 is a larger-scale, front view, with parts removed for clarity, of the packaging assembly of FIG. 1.

In particular, as shown in FIGS. 3 and 6, cam assemblies 22a, 22b are fixed onto the respective frames 5a, 5b so as to protrude from the same side thereof. Each cam assembly 22a, 22b comprises a plurality of cams 23a, 23b, 24a, 24b, 25a, 25b, 26b extending throughout the length of the respective operative branch P1, Q1 along direction A.

Cams 23a, 23b, 24a, 24b, 25a, 25b and 26b are defined by respective shaped plates extending parallel to each other and to directions A and B, as well as spaced to each other along direction C.

Figure 7:
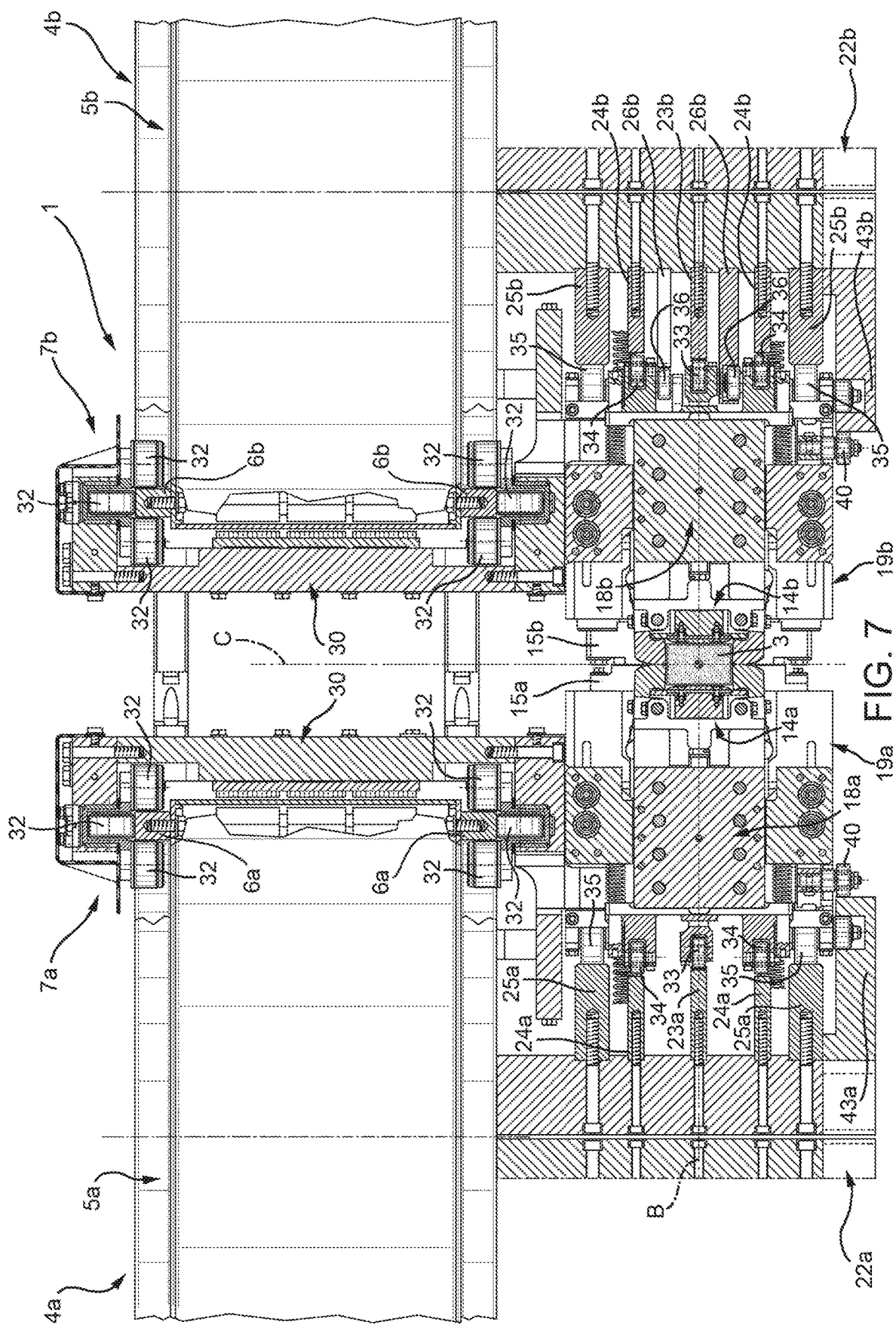
FIG. 7 is a larger-scale section along the line VII-VII of FIG. 6.
Figure 8:
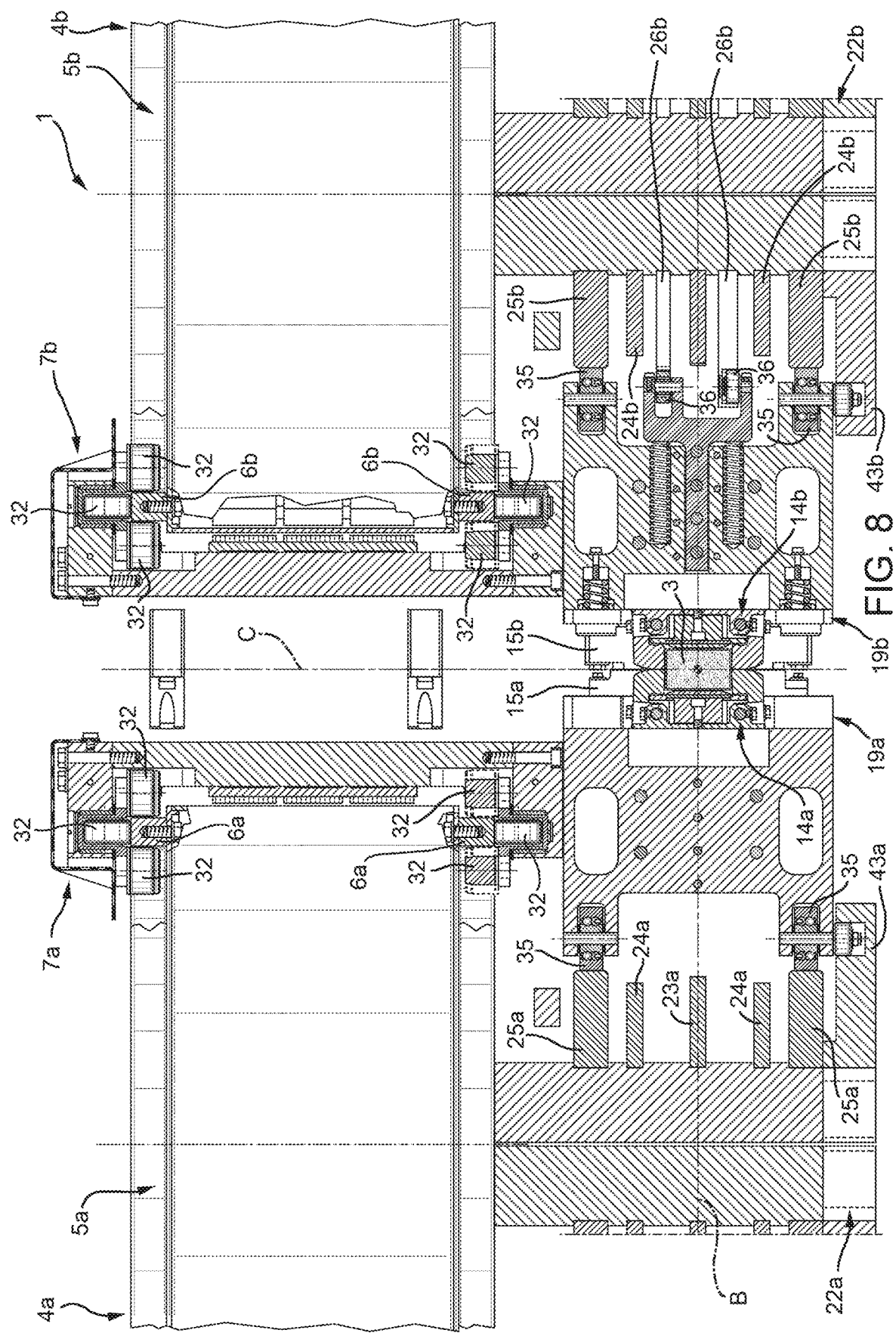
FIG. 8 is a larger-scale section along the line VIII-VIII of FIG. 6.
Figure 9A:
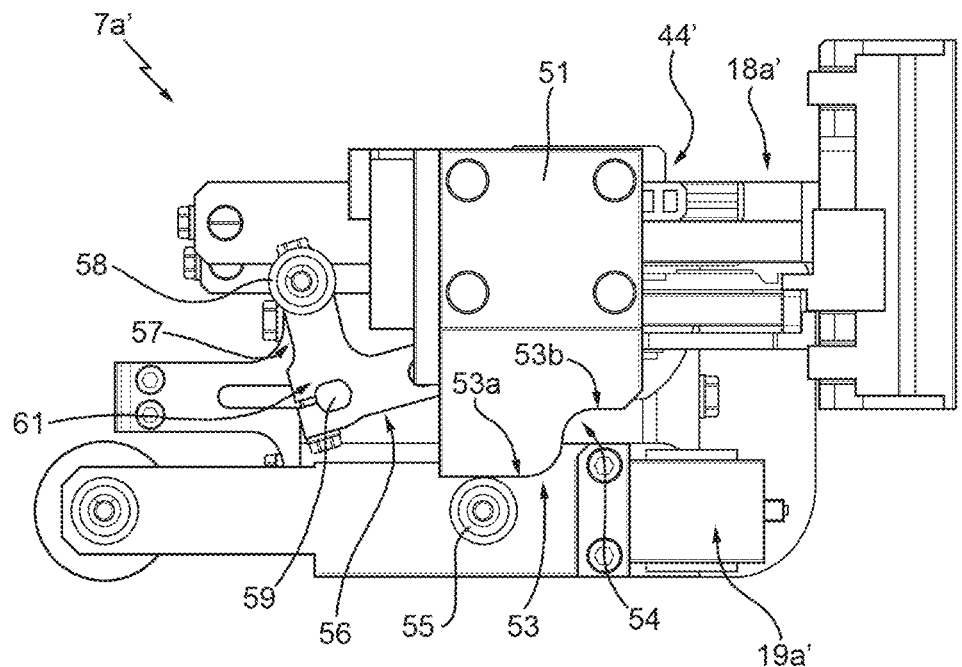
FIGS. 9a and 9b are lateral views of a different embodiment of a cart of the packaging assembly according to the present invention.
Figure 9B:
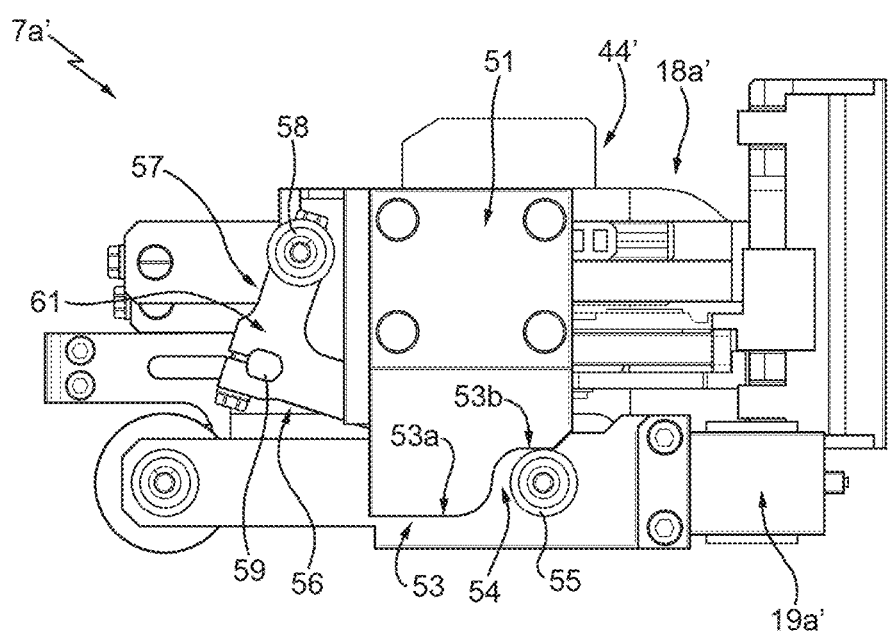
Figure 9C:
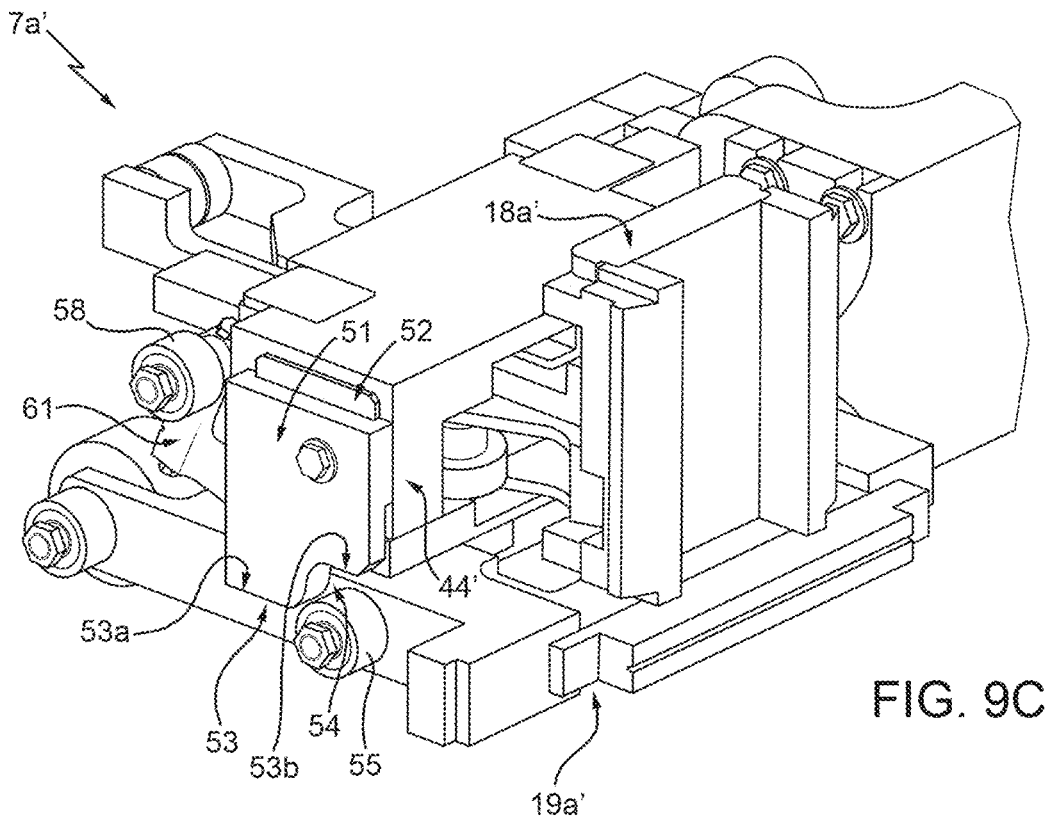
FIG. 9c is a perspective view of the cart of FIGS. 9a and 9b.
Figure 9D:
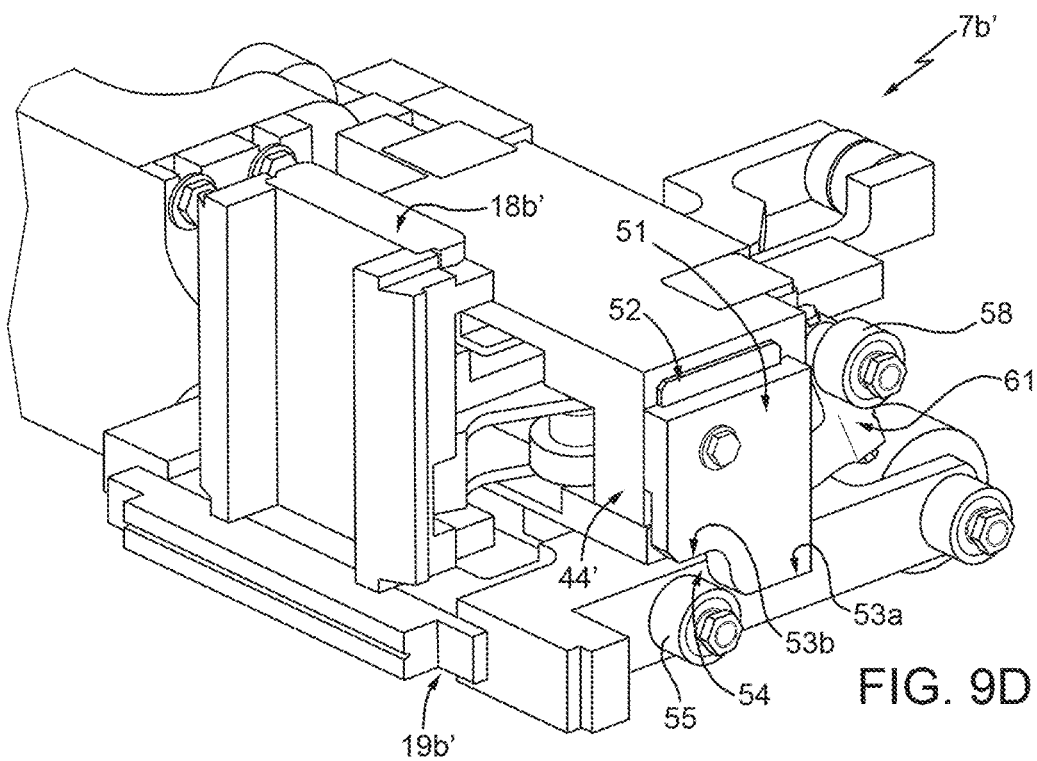
FIG. 9d is a perspective view of another cart of the packaging assembly according to the present invention and corresponding to the cart of FIGS. 9a, 9b and 9c.

As shown in FIGS. 7 and 8, cam 23a is adapted to cooperate with cam follower 33 carried by each forming unit 18a, so as to control the movement of the respective half-shell 14a along direction B, from the idle position to the operative position; the same applies to cam 23b with respect to the respective half-shell 14b.

Cams 24a are adapted to cooperate with cam followers 34 carried by each forming unit 18a, so as to control the rotation of the respective flaps 21 about the respective hinges, from the idle position to the operative position; the same applies to cams 25b with respect to flaps 21 of the respective half-shell 14b.

Cams 25a are adapted to cooperate with cam followers 35 carried by each sealing unit 19a, and are configured to control the movement of the respective counter-sealing device 15a along direction B, from the idle position to the operative position.

Cams 25b are adapted to cooperate with cam followers 35 carried by each sealing unit 19b, and are configured to control the movement of the respective sealing device 15b along direction B, from the idle position to the operative position.

Cams 26b are adapted to cooperate with cam followers 36 of each sealing unit 19b and are configured to control the movement of the respective cutting element 16b from an idle position to an operative position.

Along direction C and with reference to cam assembly 22b, cam 23b is interposed between cams 26b, cams 26b are interposed between cams 24b, and the cams 24b are interposed between cams 25b.

Analogously, along direction C and with reference to cam assembly 22a, cam 23a is interposed between cams 24a, and cams 24a are interposed between cams 25a.

In particular, each cam 23a, 23b, 24a, 24b, 25a, 25b and 26b comprises a main portion and an operative portion, both parallel to direction A. More specifically, the operative portion of each cam 23a, 23b, 24a, 24b, 25a, 25b and 26b extends at a distance from axis X of tube 2 which is smaller than the distance from the same axis X at which the corresponding main portion extends. In practice, the operative portion of each cam 23a, 23b, 24a, 24b, 25a, 25b and 26b protrudes from the respective main portion parallel to direction B towards axis X, and is connected to the main portion by two inclined curved portions. The inclined curved portions are configured to ensure a smooth transition of half-shells 14a, 14b, counter-sealing/sealing device 15a, 15b and cutting element 16b from operative to idle positions and back.

To ensure a correct sequencing of the above-described movements, operative portions are arranged in the following manner, with reference to each cam assembly 22a, 22b and to the respective path P, Q:

the operative portion of each cam 23a, 23b is arranged upstream of the operative portions of cams 24a, 24b; and the operative portions of cams 24a, 24b are arranged upstream of the operative portions of cams 25a, 25b.

With reference to cam assembly 22b, the operative portions of cams 25b is arranged upstream of the operative portions of cams 26b.

Half-shells 14a, 14b, counter-sealing/sealing devices 15a, 15b, and cutting element 16b are pushed towards their respective idle positions by springs, which act on the respective cam followers 33, 34, 35, 36.

Advantageously, each forming unit 18a, 18b is mounted onto arm 31 of one respective cart 7a, 7b in a linearly movable manner towards and away from the corresponding sealing unit 19a, 19b mounted onto the same arm 31.

Specifically, each forming unit 18a, 18b is linearly movable towards the corresponding sealing unit 19a, 19b along direction A, in the following conditions:

while such forming unit 18a, 18b and such sealing unit 19a, 19b are moving along the respective operative branch P1, Q1;

while the corresponding half-shell 14a, 14b and the relative flaps 21 are in their operative positions; and while the corresponding counter-sealing/sealing device 15a, 15b is moving towards its operative position.

In this way, it is possible to prevent a stretching of tube 2 between each main portion 3a of one pack 3 in formation and the immediately downstream sealing band 3b.

Preferably, such linear movement of each forming unit 18a, 18b towards and away from the corresponding sealing unit 19a, 19b is automatized by means of a cooperation between a further cam 43a, 43b of cam assembly 22a, 22b and a cam follower 40 carried by the respective cart 7a, 7b.

In particular, each cam 43a, 43b is defined by a shaped plate, extends throughout the length of operative branch P1, Q1 along direction A, and is adapted to cooperate with cam follower 40, so as to produce a transversal movement of the latter along direction B.

Also cam 43a, 43b comprises a main portion and an operative portion which protrudes from the respective main portion along direction B towards axis X, and is connected to the respective main portion by two inclined curved portions, in the manner described above for the other cams.

In greater detail, operative portion of each cam 43a, 43b is arranged in a position, along direction A, between operative portions of cams 25a, 25b and operative portions of cams 26b.

Each cart 7a, 7b comprises a lever mechanism 37 configured to convert the transversal movement of the respective cam follower 40 into the linear movement of the respective forming unit 18a, 18b towards and away from the corresponding sealing unit 19a, 19b mounted onto the cart 7a, 7b itself.

Preferably, lever mechanism 37 is arranged in correspondence of a lateral edge 44 of arm 31 of the corresponding cart 7a, 7b and comprises an oscillating glyph 39 hinged at its fulcrum 47 on the arm 31 itself. Furthermore, glyph 39 presents a first leg portion 45 articulated on the respective forming unit 18a, 18b, and a second leg portion 46 carrying cam follower 40. Both of first leg portion 45, and second leg portion 46 converge to a central portion 50 carrying fulcrum 47 of the glyph 39.

In particular, first leg portion 45 presents a slot 48 slidably engaged by a pin 49 carried by the respective forming unit 18a, 18b.

Therefore, each forming unit 18a, 18b is cyclically moved by cam 43a, 43b, cam follower 40 and lever mechanism 37 between:

a first position, in which such forming unit 18a, 18b is at maximum distance from the relative sealing unit 19a, 19b; and a second position, in which such forming unit 18a, 18b is at minimum distance from the relative sealing unit 19a, 19b.

In practice, the rotation of glyph 39 about fulcrum linearly moves the respective forming unit 18a, 18b thanks to the linear guides 28; in this way, each forming unit 18a, 18b can cyclically move linearly towards and away from the corresponding sealing unit 19a, 19b.

The movement of each forming unit 18a, 18b from the first position to the second position is controlled by interaction of cam 43a, 43b and cam follower 40, whilst the return of such forming unit 18a, 18b to the first position is determined by a spring (not shown).

The movement of each half-shell 14a, 14b along the respective operative branch P1, Q1 is defined by a combination of the displacement of such half-shell 14a, 14b and the respective flaps 21 from their idle positions to their operative positions, and the linear movement of the respective forming unit 18a, 18b towards the corresponding sealing unit 19a, 19b.

The operation of packaging assembly 1 is described hereafter starting from a condition in which two carts 7a and 7b slide onto the respective tracks 6a, 6b following paths P and Q respectively, from the relative return branch P2, Q2 to the relative operative branch P1, Q1.

In particular, carts 7a and 7b are moving from top curved portions 13at, 13bt respectively to the relative rectilinear portions 11a, 11b.

In this condition, carts 7a and 7b approach the respective operative branches P1, Q1 moving along direction A, and half-shells 14a, 14b, counter-sealing/sealing devices 15a, 15b, lever mechanisms 37 and cutting elements 16b are activated in sequence, according to the relative positions of the operative portions of cams 23a, 23b, 24a, 24b, 25a, 25b, 26b and 43a, 43b.

Therefore, as carts 7a, 7b enter the respective operative branches P1, Q1, half-shells 14a, 14b start to move toward one another along direction B, by means of interaction between the respective cams 23a, 23b and the relative cam followers 33.

Thus, half-shells 14a, 14b move from their idle positions to their operative positions, so that their walls 20 contact tube 2. At this point, flaps 21 of each half-shell 14a, 14b are controlled by cams 24a, 24b and cam followers 34, so as to rotate about their hinges towards tube 2.

In this way, half-shells 14a, 14b and the respective flaps 21 reach their operative positions, completely defining the volume and shape of the main portion 3a of one single pack 3 in formation on tube 2.

Right after flaps 21 contact tube 2 and surround it, counter-sealing/sealing devices 15a, 15b start to move along direction B towards one another, by means of the interaction between the respective cams 25a, 25b and the relative cam followers 35.

Thus, counter-sealing/sealing devices 15a, 15b move from their idle positions to their operative positions, in which they heat-seal tube 2 at equally spaced cross sections. In this way, the relative pack 3 is formed.

During the movement of counter-sealing/sealing devices 15a, 15b along direction B, each lever mechanism is controlled by means of interaction of the respective cam 43a, 43b and the relative cam follower 40, so as to rotate the respective glyph 39 about its fulcrum 47. Therefore, the corresponding forming unit 18a, 18b moves towards the relative sealing unit 19a, 19b mounted onto the same cart 7a, 7b, along direction A.

As a result, the stretching of tube 2 between each formed main portion 3a and the immediately downstream sealing band 3b is prevented.

After the sealing of tube 2 is completed, cutting element 16b is extracted, along direction B, from the relative seat on sealing unit 19b, so as to separate one formed pack 3 from the rest of tube 2. In particular, the extraction is controlled by interaction of the respective cams 26b with the relative cam followers 36.

Then, half-shells 14a, 14b return in their idle positions, so that the formed pack 3 can fall onto outlet conveyor 10.

Carts 7a, 7b then slide along the respective return branches P2, Q2 until they reach again the respective operative branches P1, Q1 to form another pack 3.

The entire operation is cyclically repeated for every pack 3 to be formed and sealed. The entire operation is also repeated for every pair of carts 7a, 7b which are present in packaging assembly 1.

Numbers 7a', 7b' in FIGS. 9a, 9b, 9c and 9d indicate as a whole a different embodiment of cooperating carts of the packaging assembly 1 according to the present invention, carrying respective forming units 18a', 18b' and respective sealing units 19a', 19b'. Carts 7a, 7b being similar to carts 7a', 7b' respectively, the following description is limited to the differences between them, and using the same references, where possible, for identical or corresponding parts.

Carts 7a', 7b' differ from carts 7a, 7b in the type of driving means used for linearly moving each respective forming unit 18a', 18b' towards and away from the corresponding sealing unit 19a', 19b' carried by the same cart 7a', 7b'.

In particular, in this case, each cart 7a', 7b' comprises a first cam element 51 mounted laterally onto the respective forming unit 18a', 18b' and a second cam element 55 mounted laterally onto the respective sealing unit 19a', 19b'. In greater detail, second cam element 55 is defined by a wheel and is configured to cooperate with first cam element 51 so as to control the linear movement of the respective forming unit 18a', 18b' towards the corresponding sealing unit 19a', 19b'.

Each cart 7a', 7b' is provided with a spring (not shown) configured to apply a downward preload force on the respective forming unit 18a', 18b', so as to push the latter downwards along direction A, i.e. in the direction of the corresponding sealing unit 19a', 19b'.

Each first cam element 51 is defined by a shaped plate mounted in a sliding manner onto the respective forming unit 18a', 18b', in correspondence of a lateral edge 44' of the relative cart 7a', 7b'. In detail, each first cam element 51 is adapted to slide along the respective lateral edge 44' by means of a linear guide 52, from an upper position to a lower position along direction A.

First cam element 51 further comprises a cam surface 53 arranged on its lower part and defining:

a main portion 53a substantially parallel to direction B; and an operative portion 53b presenting a double-curved profile and forming a recess 54.

Second cam element 55 is configured to move from a retracted position, in which it faces main portion 53a, to an advanced position, in which it faces operative portion 53b.

In greater detail, when sealing units 19a', 19b' move from their idle positions to their operative positions, in a manner similar to the one described above for sealing units 19a, 19b, the respective second cam elements 55 are dragged correspondingly along direction B. In this way, when each second cam element 55 faces recess 54 of operative portion 53b of the corresponding cam surface 53, the respective first cam element 51 is urged by the respective spring from its upper position to its lower position, and the relative forming unit 18a', 18b', being carried by the first cam element 51, moves to its second position towards the corresponding sealing unit 19a', 19b'.

In particular, in this condition, such first cam element 51 is allowed to slide along linear guide 52 to its lower position, due to recess 54 and under the downward preload force applied by the aforementioned spring. In this way, it is possible to prevent a stretching of tube 2 between each main portion 3a of one pack 3 in formation and the immediately downstream sealing band 3b.

Each cart 7a', 7b' also comprises a respective lever mechanism 61, configured to move back the respective forming unit 18a', 18b' to the first position.

In greater detail, each lever mechanism 61 is arranged in correspondence of lateral edge 44' of the respective cart 7a', 7b', and comprises a first leg portion 56 coupled with the relative forming unit 18a', 18b' and a second leg portion 57 carrying a cam follower 58. Both first leg portion 56 and second leg portion 57 converge to a central portion carrying a fulcrum 59 of the lever mechanism 61.

In particular, each cam follower 58 is configured to cooperate with a return cam (not shown), so that a transversal movement of the cam follower 58, along direction B, is produced. As cam follower 58 moves transversally, lever mechanism 61 rotates, due to the presence of fulcrum 59. In this way, by means of the coupling between first leg portion 56 and the relative forming unit 18a', 18b', the latter moves to the first position, i.e. away from the corresponding sealing unit 19a', 19b', counteracting the downward preload force exterted by the aforementioned spring, and carrying first cam element 51 back to its upper position. As such sealing unit 19a', 19b' moves back to its idle position, second cam element 55 faces again main portion 53a of cam surface 53, holding first cam element 51 in the upper position.

Figure 10B:
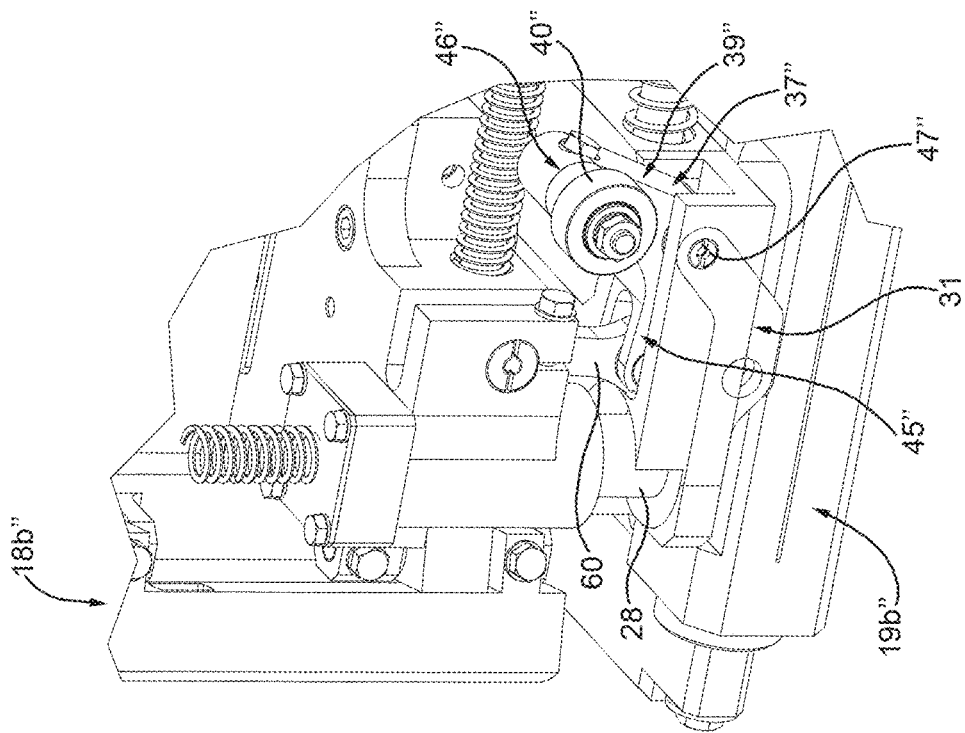
Figure 10A:
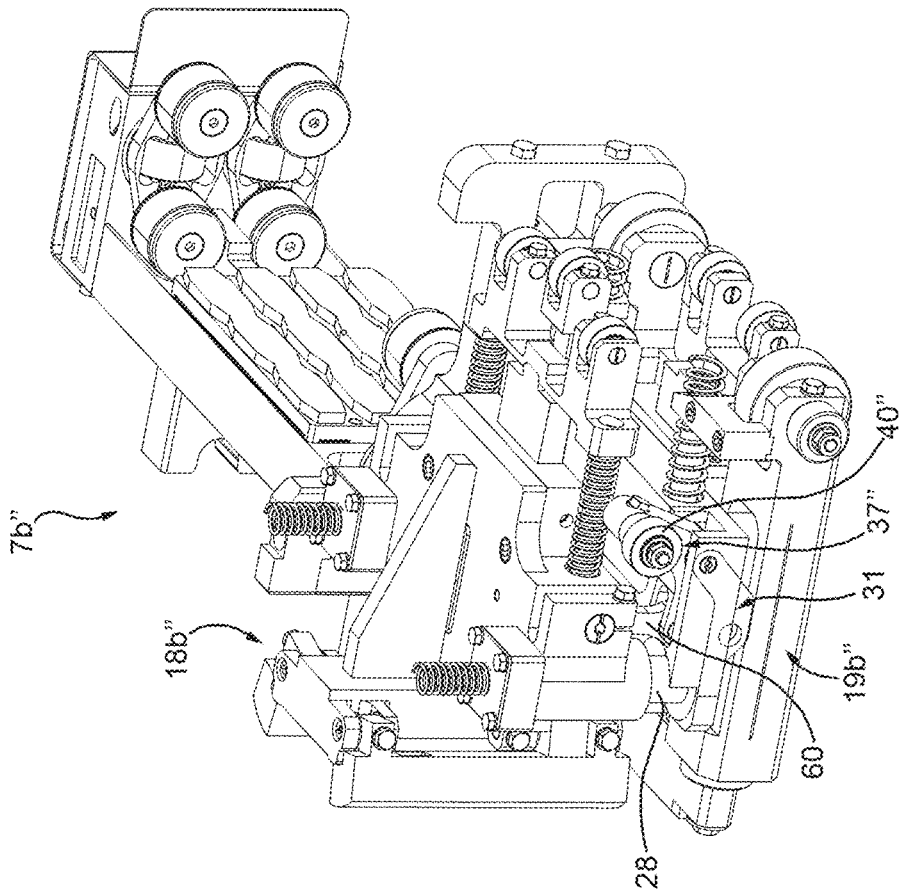
FIG. 10a is a perspective view of a further embodiment of a cart of the packaging assembly according to the present invention.
Figure 10C:
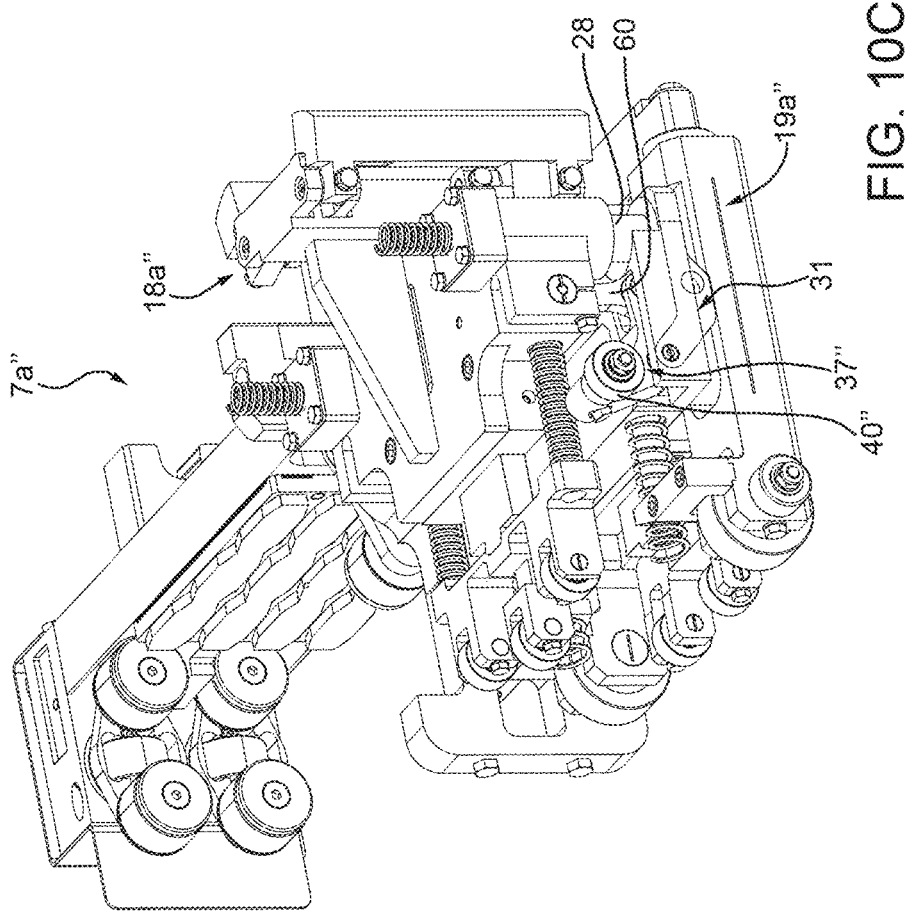
FIG. 10c is a perspective view of another cart of the packaging assembly according to the present invention and corresponding to the cart of FIGS. 10a and 10b.

Numbers 7a", 7b" in FIGS. 10a, 10b, 10c indicate as a whole a further embodiment of cooperating carts of the packaging assembly 1 according to the present invention, carrying respective forming units 18a", 18b" and respective sealing units 19a", 19b". Carts 7a", 7b" similar to carts 7a, 7b respectively, the following description is limited to the differences between them, and using the same references, where possible, for identical or corresponding parts.

In particular, each cart 7a", 7b" comprises a respective lever mechanism 37", which has a configuration differing from the one of lever mechanism 37.

In greater detail, each lever mechanism 37" comprises an oscillating glyph 39" hinged at its fulcrum 47" on arm 31 of the relative cart 7a", 7b".

Each glyph 39" comprises a first leg portion 45" and a second leg portion 46" carrying a cam follower 40" adapted to cooperate with cam 43a, 43b. Both first leg portion 45" and second leg portion 46" converge to a central portion carrying fulcrum 47".

Lever mechanism 37" further comprises a rod 60, hinged, at one axial end, to first leg portion 45" and, at the opposite axial end, to the relative forming unit 18a", 18b". In practice, rod 60 connects glyph 39" to the respective forming unit 18a", 18b".

In use, each lever mechanism 37" is configured to convert the transversal movement of the respective cam follower 40", imparted to it by means of the interaction with cam 43a, 43b, into a mutual rotation movement of the respective glyph 39" and rod 60, so as to allow the linear movement of the respective forming unit 18a", 18b" towards the corresponding sealing unit 19a", 19b" carried by the same cart 7a", 7b".

In this way, it is possible to prevent a stretching of tube 2 between each main portion 3a of one pack 3 in formation and the immediately downstream sealing band 3b.

The return of each forming unit 18a", 18b" in its initial position away from the corresponding sealing unit 19a", 19b" is determined by a spring, in a similar manner to the one described above relative to carts 7a, 7b.

The advantages of packaging assembly 1 according to the present invention will be clear from the foregoing description.

In particular, the solution hereby proposed by the Applicant involves a smaller number of carts 7a, 7b, 7a', 7b', 7a", 7b" than the configuration disclosed in EP-A-3053835, because each forming unit 18a, 18b, 18a', 18b', 18a", 18b" and the corresponding sealing unit 19a, 19b 19a', 19b', 19a", 19b" are carried by one single cart, so limiting the total number of components, improving the overall reliability and reducing the complexity of the packaging assembly 1 as well as the overall costs.

Furthermore, the linear movement of forming units 18*a*, 18*b*, 18*a*', 18*b*', 18*a*", 18*b*" towards and away from the corresponding sealing units 19*a*, 19*b*, 19*a*', 19*b*', 19*a*", 19*b*" is more reliable than a non-linear movement, as it applies less stress onto tube 2. In fact, such linear movement supports and follows the movement of tube and avoids possible stretching of the packaging material during the sealing operation, the latter being the most delicate and crucial part of the process.

Clearly, changes may be made to packaging assembly 1 as described herein without, however, departing from the scope of protection as defined in the accompanying claims.

The invention claimed is:

1. A packaging assembly configured to form and seal a plurality of packs containing a pourable food product starting from a tube of packaging material; said assembly comprising:
    at least a pair of tracks; and
    at least a pair of moving elements, which are cyclically movable along said tracks, respectively;
    each said moving element comprising at least one forming unit configured to cooperate with said tube so as to surround partially a portion of said tube destined to form a main portion of one respective pack; and at least one sealing unit configured to cooperate with said tube so as to sequentially seal said tube at predetermined consecutive cross sections, each pair of consecutive cross sections forming opposite sealing bands of one respective pack;
    each said forming unit being mounted onto the respective moving element in a linearly movable manner towards and away from the corresponding sealing unit mounted onto the same moving element.

2. The packaging assembly as claimed in claim 1, wherein said tube is fed to said assembly between said tracks, along an advancement straight direction; each forming unit being linearly movable towards said corresponding sealing unit along said advancement straight direction while the moving element carrying both the forming unit and the sealing unit advances parallel to said advancement straight direction.

3. The packaging assembly as claimed in claim 2, further comprising actuator means configured to control linear movement of each said forming unit towards the corresponding sealing unit.

4. The packaging assembly as claimed in claim 3, wherein said actuator means comprise, for each track, at least one cam surface fixed with respect to the track, and a cam follower carried by the respective moving element.

5. The packaging assembly as claimed in claim 4, wherein said cam surface extends along said advancement straight direction and is configured to cooperate with the respective cam follower so as to produce a movement of the cam follower transversal to said advancement straight direction,
    and wherein each moving element comprises a lever mechanism for converting said transversal movement of the respective cam follower into said linear movement of the respective forming unit towards and away from the corresponding sealing unit.

6. The packaging assembly as claimed in claim 5, wherein each forming unit is cyclically moved by the respective cam surface, cam follower and lever mechanism between:
    a first position, in which said forming unit is at a maximum distance from the corresponding sealing unit; and
    a second position, in which said forming unit is at a minimum distance from the corresponding sealing unit.

7. The packaging assembly as claimed in claim 5, wherein each lever mechanism comprises an oscillating member hinged at its fulcrum on the respective moving element; each oscillating member having a first portion articulated on the respective forming unit, and a second portion carrying the respective cam follower.

8. The packaging assembly as claimed in claim 7, wherein each lever mechanism further comprises an elongated member hinged, at one axial end, to said first portion and, at the opposite axial end, to the respective forming unit.

9. The packaging assembly as claimed in claim 3, wherein said actuator means comprise, for each moving element, at least one first interaction element carried by the respective forming unit and a second interaction element carried by the corresponding sealing unit, movable together with the sealing unit towards and away from said tube between a retracted and an advanced position, and cooperating with said first interaction element to cause said linear movement of said forming unit towards said sealing unit.

10. The packaging assembly as claimed in claim 9, wherein each forming unit is mounted onto the respective moving element in a slidable manner along at least one linear guide, and wherein said first interaction element is mounted laterally onto the respective forming unit and is movable, along said advancement straight direction, from an upper position to a lower position by way of said linear guide.

11. The packaging assembly as claimed in claim 10, wherein said first interaction element is retained in said upper position when said second interaction element is in said retracted position, and wherein said first interaction element moves in said lower position when said second interaction element moves from said retracted position to said advanced position.

12. The packaging assembly as claimed in claim 11, wherein said first interaction element includes a lower part, said first interaction element comprising a cam surface arranged on its lower part and defining a main portion substantially transverse to said advancement straight direction and an operative portion having a recess; and wherein said second interaction element is mounted laterally onto the respective sealing unit and is movable, along a direction transverse to said advancement straight direction, from said retracted position, in which it cooperates with said main portion, to said advanced position, in which it cooperates with said operative portion.

13. The packaging assembly as claimed in claim 1, wherein each forming unit is mounted onto the respective moving element in a slidable manner along at least one linear guide.

14. The packaging assembly as claimed in claim 1, wherein said tracks define respective endless paths comprising:
    respective operative branches between which said tube is fed, and along which each said forming unit and each said respective sealing unit cooperate with said tube; and
    respective return branches along which each said forming unit and each said respective sealing unit are detached from the tube;
    each said forming unit being linearly movable towards the corresponding sealing unit while the moving element advances along the respective operative branch.

15. The packaging assembly as claimed in claim 1, wherein each forming unit comprises a volume control device cyclically drivable between:
    an operative position, in which, in use, said volume control device cooperates with said tube and with the volume control device of another forming unit to form the main portion of one respective pack; and an idle position, in which, in use, said volume control device is detached from said tube;

and wherein each said sealing unit comprises a sealing device cyclically drivable between:

an operative position, in which, in use, said sealing device cooperates with said tube and with the sealing device of another sealing unit to form the sealing bands of said packs; and an idle position, in which, in use, said sealing device is detached from said tube or from said pack;

each said forming unit being linearly movable towards the corresponding sealing unit while said volume control device is in said operative position, and while said sealing device is moving towards said operative position.

16. The packaging assembly as claimed in claim 15, further comprising actuator means configured to automatically control the cyclic displacement of said volume control devices and said sealing devices between said operative and idle positions.

17. The packaging assembly as claimed in claim 16, wherein said actuator means comprise, for each track, further cam surfaces, fixed with respect to the track, and further cam followers carried respectively by said forming units and said sealing units.

18. The packaging assembly as claimed in claim 17, wherein said tube is fed to said assembly along an advancement straight direction, and wherein said further cam surfaces extend along said advancement straight direction and are configured to produce a transversal movement of the respective cam followers traverse to said advancement straight direction.

19. The packaging assembly as claimed in claim 15, wherein said tracks define respective endless paths comprising respective operative branches between which said tube is fed, and along which each said forming unit and each said respective sealing unit cooperate with said tube, and wherein the movement of each volume control device along the respective operative branch is defined by a combination of the cyclic displacement of the volume control device from said idle position to said operative position with said linear movement of the respective forming unit towards the corresponding sealing unit.

20. The packaging assembly as claimed in claim 1, wherein each moving element and the respective track define a linear motor.

21. The packaging assembly as claimed in claim 1 comprising a plurality of said moving elements cyclically movable along one of said tracks and a plurality of said moving elements cyclically movable along an other of the tracks; the moving elements moving along the one track being independently movable with respect to each other and cooperating with corresponding moving elements moving along the other track, and the moving elements moving along the other track being independently movable with respect to each other and cooperating with corresponding moving elements moving along the one track.

* * * * *